US008826300B2

(12) United States Patent  
Turnbull (10) Patent No.: US 8,826,300 B2  
(45) Date of Patent: Sep. 2, 2014

(54) FILE SYSTEM INTERFACE FOR A MESSAGE SERVICE SYSTEM

(75) Inventor: Adam Stewart Turnbull, Binfield (GB)

(73) Assignee: Oracle America, Inc., Redwood City, CA (US)

(*) Notice: Subject to any disclaimer, the term of this patent is extended or adjusted under 35 U.S.C. 154(b) by 1313 days.

(21) Appl. No.: 12/368,117

(22) Filed: Feb. 9, 2009

(65) Prior Publication Data

US 2010/0205610 A1      Aug. 12, 2010

(51) Int. Cl.
  *G06F 9/54*  (2006.01)
  *G06F 1/00*  (2006.01)
(52) U.S. Cl.
  CPC ............ *G06F 9/546* (2013.01); *G06F 9/541* (2013.01)
  USPC .......................................... 719/313; 707/600
(58) Field of Classification Search
  USPC .......................................... 719/313; 709/201
  See application file for complete search history.

(56) References Cited

U.S. PATENT DOCUMENTS

| 5,287,453 A * | 2/1994 | Roberts .................... 709/201 |
| 7,167,867 B1 * | 1/2007 | Rago ............................. 1/1 |
| 2009/0112921 A1 * | 4/2009 | Oliveira et al. ........... 707/103 R |

OTHER PUBLICATIONS

Author Unknown, Fuse-J.  
Author Unknown, Filesystem in Userspace.

* cited by examiner

*Primary Examiner* — Andy Ho  
*Assistant Examiner* — Abdou Seye  
(74) *Attorney, Agent, or Firm* — Polsinelli PC (57) ABSTRACT

A system, including a computing device, performs a method for communicating with a message service via a file system interface. A file system driver receives a file system call from an application program executing on the computing device. The file system driver converts the received file system call into a message service request. The file system driver transmits the message service request to a message service server. The message service server processes the message service request and generates a response to the message service request. The message service server then sends the message service response to the file system driver. The file system driver converts the received message service response into a file system call response. The file system driver may return the file system call response to the application program or may store the file system call response as a file system file in a file system.

20 Claims, 6 Drawing Sheets

FILE SYSTEM INTERFACE FOR A MESSAGE SERVICE SYSTEM

FIELD OF THE INVENTION

Aspects of this invention relate generally to computing devices, and more specifically to a file system interface for a messaging system.

BACKGROUND

Messaging, such as provided by the Java™ Message Service, involves loosely coupled peer-to-peer communication between software components and/or application programs executing on one or more computing devices. The software components and/or application programs, sometimes referred to as message service clients, can send messages to or receive messages from any other message service client via a message service server (also referred to as a messaging provider). The messaging provider often stores the messages in a queue. In order for message service clients to communicate, the sender and receiver may not require any information about the other (including such details as operating system and network interfaces) and/or be available at the same time. The sender and receiver may rather be configured to communicate with the messaging service server, or be configured to communicate with the proper message format and include information about where to send messages and/or receive messages (i.e., the queue). The Java™ Message Service provides an application programming interface that defines a common set of interfaces and associated semantics that allow software components and/or application programs written in the Java™ programming language to communicate with a Java™ Message Service server.

A file system (such as the NTFS file system or the ZFS file system) includes mechanisms for storing and organizing computer files and the data they contain. Generally, file systems often utilize a data storage medium, such as a hard disk or CD-ROM, and maintain the physical location of the files. File systems also oftentimes provide access to data on a file server by acting as clients for a network protocol (such as the Network File System protocol or the Server Message Block protocol) or involve virtual file systems and exist as an access method for virtual data.

Software components and/or application programs interact with a file system via a file system driver of the operating system of the computing device the software components and/or application programs are executing upon, by issuing one or more file system calls (such as a read file call, a write file call, a delete file call, and etc.) to the file system. Some application programs, particularly legacy applications, may exchange data in the form of files. These application programs may not be inherently capable of communicating via messages. Updating these applications to utilize messaging often requires considerable investment in terms of time and money, and the conversion may not be without risk. Further, application programs for administering message service servers may be proprietary, complex to utilize, and differ greatly.

SUMMARY

The present disclosure provides systems and methods for communicating with a message service system via a file system interface. In one particular example implementation, a file system driver receives a file system call from an application program, converts the file system call into a message service request, and transmits the message service request to the message service server. Thus, the file system is utilized as an interface to the message service server. The interface enables application programs, which are not inherently capable of utilizing message services, to communicate via the message service. Additionally, the interface enables simple and uniform administration of different message service implementations by allowing an administration application program to interact with message queues as directories and messages as files.

A system for communicating with a message service via a file system interface, in accordance with one or more embodiments of the present disclosure, includes a computing device that includes a processing unit and a memory communicably coupled to the processing unit. The processing unit may include an application program and a file system driver involving executable instructions configured to perform various aspects of the present disclosure. The system also includes a second computing device, which internally includes a message service server. Though the computing device and the second computing device are described as separate devices, in some embodiments the computing device and the second computing device may constitute a single device. The system may perform a method for communicating with a message service via a file system interface, in accordance with one or more embodiments of the present disclosure.

In a first operation, the file system driver may receive a file system call from an application program executing on the computing device. The file system call may include any type of file system call, such as a call to create a file, read a file, delete a, create a directory, read a directory, delete a directory, and/or a combination thereof.

In a second operation, the file system driver converts the received file system call into a message service request. For example, if the received file system call is a create file call, the file system driver converts the create file call into a post message request. If the received file system call is a read file call, the file system driver converts the read file call into a read message request. If the received file system call is a delete file call, the file system driver converts the delete file call into a delete message request. If the received file system call is a create directory call, the file system driver converts the create directory call into a create queue request. If the received file system call is a read directory call, the file system driver converts the read directory call into a read queue request. If the received file system call is a delete directory call, the file system driver converts the delete directory call into a delete queue request.

In a third operation, the file system driver transmits the message service request to the message service server, which may be executing on the second computing device. The message service server may process the message service request and generate a response to the message service request. The message service server then sends the message service response to the file system driver. For example, in response to a request to read a message or queue, the message service server may return the contents of the message or queue. By way of another example, in response to a request to post or delete a message or queue, the message service server may return a return code, indicating whether the request was received correctly or whether an error occurred.

In a fourth operation, the file system driver receives the message service response from the message service server. The message service response may include the contents of a message, the contents of a directory, a return code, and/or other information.

In a fifth operation, the file system driver converts the received message service response into a file system call response. The file system call response may include information formatted as contents of a file system file. The information formatted as contents of a file system file may include the contents of a message. The file system call response may also include information formatted as contents of a file system directory. The information formatted as contents of a file system directory includes the contents of a directory, in one example. The file system call response may also include a return code. The return code may be formatted as a file system call return code.

In a sixth operation, the file system driver may return the file system call response to the application program or may store the file system call response as a file system file in a file system. The file system driver may store the file system call response as a file system file in a file system for purposes of caching. For example, if the file system call response includes the contents of a message formatted as contents of a file system file, the file system driver may cache the file system call response by storing the file system call response as a file system file in a file system. Subsequently, the file system driver may access the cached file system call response rather than contacting the message service server to obtain the contents of the message. The file system driver can store the file system call response as a file system file in a file system utilizing another file system driver.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The present disclosure may be better understood, and its numerous features made apparent to those skilled in the art by referencing the accompanying drawings.

DETAILED DESCRIPTION

The present disclosure provides systems and methods for communicating with a message service system via a file system interface. In one particular example implementation, a file system driver receives a file system call from an application program, converts the file system call into a message service request, and transmits the message service request to the message service server. Thus, the file system is utilized as an interface to the message service server. The interface enables application programs, which are not inherently capable of utilizing message services, to communicate via the message service. Additionally, the interface enables simple and uniform administration of different message service implementations by allowing an administration application program to interact with message queues as directories and messages as files.

Figure 1:
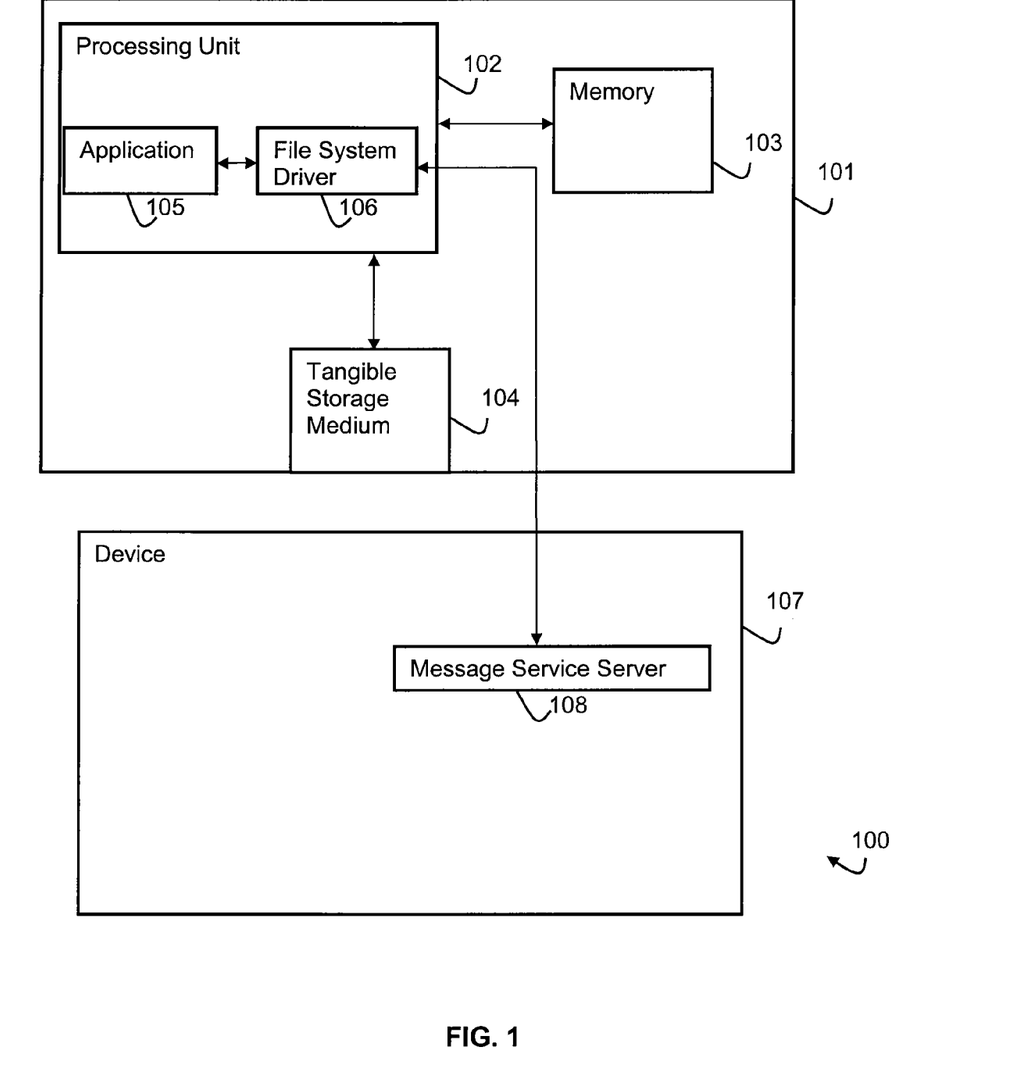
FIG. 1 is a block diagram illustrating a system 100 for communicating with a message service via a file system interface, in accordance with one or more embodiments of the present disclosure.

FIG. 1 illustrates a system 100 for communicating with a message service via a file system interface, in accordance with one or more embodiments of the present disclosure. The system 100 includes a computing device 101 that includes a processing unit 102 and a memory 103 communicably coupled to the processing unit 102. A computing device may include any kind of device that performs computation, such as a personal digital computer, a laptop computer, a server computer, a terminal, a workstation, a router, a personal digital assistant, and/or a cellular telephone. The processing unit 102 may include an application program 105 and a file system driver 106 involving executable instructions configured to perform various aspects of the present disclosure. While the system 100 has been described as including computing device 101, a single processing unit 102, and a single memory 103, it will be understood that system 100 is illustrative and that multiple computing devices 101 (which may be communicably coupled), multiple processing units 102, and/or multiple memories 103 may be utilized without departing from the scope of the present disclosure.

The computing device 101 may also be configured to interact (read/write) to one or more tangible machine-readable storage media 104, which may or may not be removable and which may include magnetic storage media (e.g., floppy diskette), optical storage media (e.g., CD-ROM); magneto-optical storage media, read only memory, random access memory, erasable programmable memory (e.g., EPROM and EEPROM); flash memory, or other types of media suitable for storing electronic information. Hence, the computing device 101 may include a CD-ROM drive, a floppy drive, a hard disk drive, etc. The computing device 101 may also include (not shown) one or more input and/or output devices (including, but not limited to displays, keyboards, mice, printers, scanners, and so forth), one or more busses (including, but not limited to, universal serial bus, small computer system interface, and so forth), and/or one or more communication components (including, but not limited to, modems, Ethernet adapters, wireless Ethernet adapters, and so forth).

In the implementation shown in FIG. 1, the system 100 also includes a second computing device 107, which internally includes a message service server 108. The second computing device 107 may include (not shown) one or more processing units, memories, tangible machine-readable storage media, input and/or output devices (including, but not limited to displays, keyboards, mice, printers, scanners, and so forth), one or more busses (including, but not limited to, universal serial bus, small computer system interface, and so forth), and/or one or more communication components (including, but not limited to, modems, Ethernet adapters, wireless Ethernet adapters, and so forth). The second computing device 107 may be communicably connected to the computing device 101. Though the computing device 101 and the second computing device 107 are shown as separate devices, in some embodiments the computing device 101 and the second computing device 107 may constitute a single device.

Figure 2:
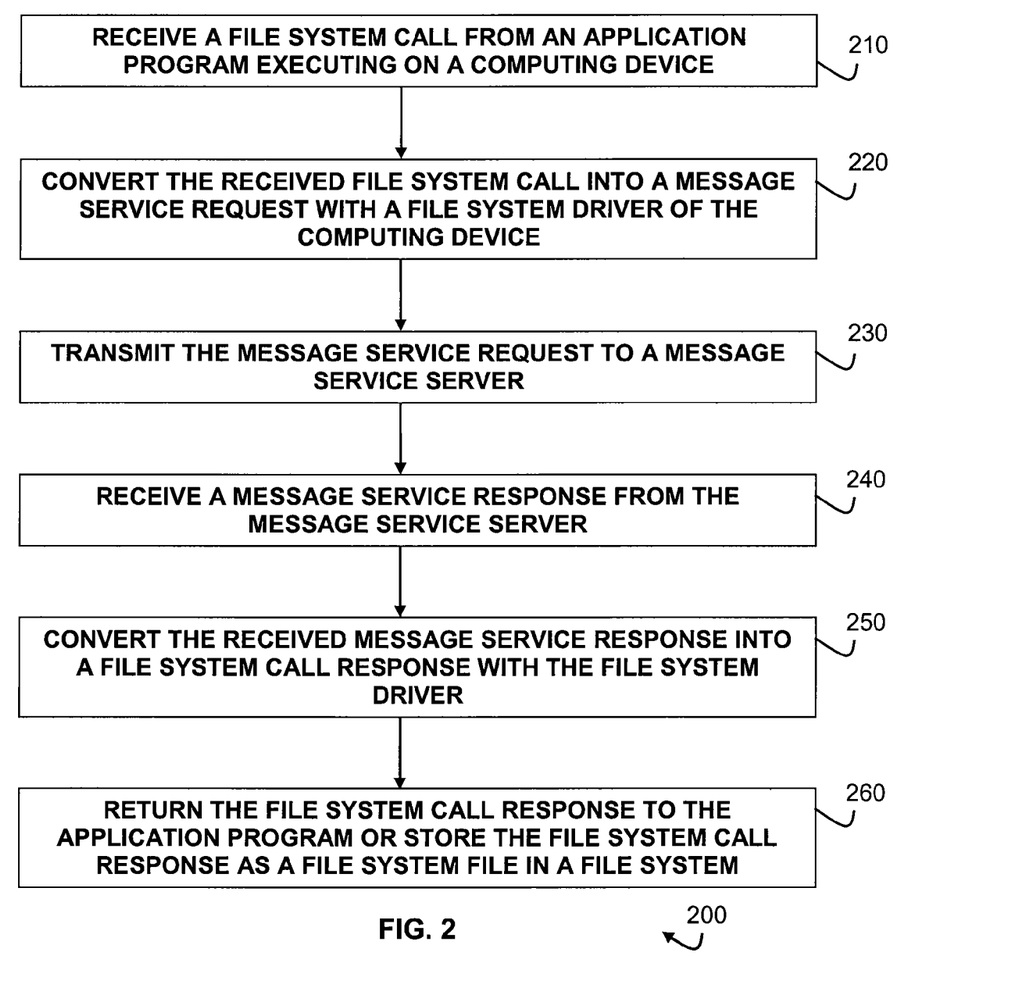
FIG. 2 method diagram illustrating a method 200 for communicating with a message service via a file system interface, which may be performed by the system 100 of FIG. 1, in accordance with one or more embodiments of the present disclosure.

FIG. 2 illustrates a method 200 for communicating with a message service via a file system interface, which may be performed by the system 100, in accordance with one or more embodiments of the present disclosure. The method 200 may comprise a computer-implemented method. The computer-implemented method may be performed by a processing unit, such as the processing unit 102, executing one or more sets of instructions included in a computer program product stored in a machine-readable medium, such as the memory 103 and/or the storage medium 104.

In a first operation 210, the file system driver 106 may receive a file system call from an application program 105 executing on the computing device 101. The file system call may include any type of file system call, such as a call to create a file, read a file, delete a file, create a directory, read a directory, delete a directory, and/or a combination thereof.

The application program 105 may include any of a variety of possible applications, or software components, such as a sales application, an accounting application, an inventory application, an ordering application, a database application, a word processing application, a browser application, a file browser (such as Windows™ Explorer), a spreadsheet application, a media player application, an email application, a scheduling application, a presentation application, an analytical application, a financial application, an educational application, a system application, a media development application, and/or a product engineering application.

In a second operation 220, the file system driver 106 converts the received file system call into a message service request. For example, if the received file system call is a create file call, the file system driver 106 converts the create file call into a post message request. If the received file system call is a read file call, the file system driver 106 converts the read file call into a read message request. If the received file system call is a delete file call, the file system driver 106 converts the delete file call into a delete message request. If the received file system call is a create directory call, the file system driver 106 converts the create directory call into a create queue request. If the received file system call is a read directory call, the file system driver 106 converts the read directory call into a read queue request. If the received file system call is a delete directory call, the file system driver 106 converts the delete directory call into a delete queue request.

In a third operation 230, the file system driver 106 transmits the message service request to the message service server 108, which may be executing on the second computing device 107. The message service server 108 may process the message service request and generate a response to the message service request. The message service server 108 then sends the message service response to the file system driver 106. For example, in response to a request to read a message or queue, the message service server 108 may return the contents of the message or queue. By way of another example, in response to a request to post or delete a message or queue, the message service server 108 may return a return code, indicating whether the request was received correctly or whether an error occurred.

In a fourth operation 240, the file system driver 106 receives the message service response from the message service server 108. The message service response may include the contents of a message, the contents of a queue, a return code, and/or other information.

In a fifth operation 250, the file system driver 106 converts the received message service response into a file system call response. The file system call response may include information formatted as contents of a file system file. The information formatted as contents of a file system file may include the contents of a message. The file system call response may also include information formatted as contents of a file system directory. The information formatted as contents of a file system directory includes the contents of a directory, in one example. The file system call response may also include a return code. The return code may be formatted as a file system call return code.

In a sixth operation 260, the file system driver 106 may return the file system call response to the application program 105 or may store the file system call response as a file system file in a file system. The file system driver 106 may store the file system call response as a file system file in a file system for purposes of caching. For example, if the file system call response includes the contents of a message formatted as contents of a file system file, the file system driver 106 may cache the file system call response by storing the file system call response as a file system file in a file system. Subsequently, the file system driver 106 may access the cached file system call response rather than contacting the message service server 108 to obtain the contents of the message. The file system driver 106 can store the file system call response as a file system file in a file system utilizing another file system driver.

By way of example, the file system driver 106 may receive a file system call, to create a file, from the application program 105. For a file system, creating a file may involve the operations of opening the file, writing data to the file, and closing the file. The file system driver 106 converts the file system call into a post message service request and transmits the message service request to the message service server 108. Corresponding to opening the file, the file system driver 106 may connect to a queue on the message service server 108 and create a message object. Corresponding to writing data to the file, the file system driver 106 may write data included in the file system call to the message and send the message to the queue. Then, corresponding to closing the file, the file system driver 106 may commit the message to the queue and close the connection to the queue. The file system driver 106 may then format a return code received from the message service server 108, indicating that the post message service request was completed successfully, as a return code to the file system call to create the file and return the return code to the application program 105.

By way of another example, the file system driver 106 may receive a file system call, to read a file, from the application program 105. For a file system, reading a file may involve the operations of opening the file, reading data from the file, and closing the file. The file system driver 106 converts the file system call into a read message service request, transmits the message service request to the message service server 108, receives a message service response from the message service server 108 in response to the message service request, converts the message service response into a file system call response, and returns the file system call response to the application program 105. Corresponding to opening the file, the file system driver 106 may connect to a queue on the message service server 108 and select a message to read. Corresponding to reading data from the file, the file system driver 106 may read data from the message. Then, corresponding to closing the file, the file system driver 106 may rollback the message to the queue (if the message service server 108 utilizes a message service such as Java™ Message Service, wherein reading a message is a destructive operation, otherwise rollback may not be performed) and close the connection to the queue. The file system driver 106 may then format the data read from the message as the contents of a file system file and return the data to the application program 105.

Figure 3:
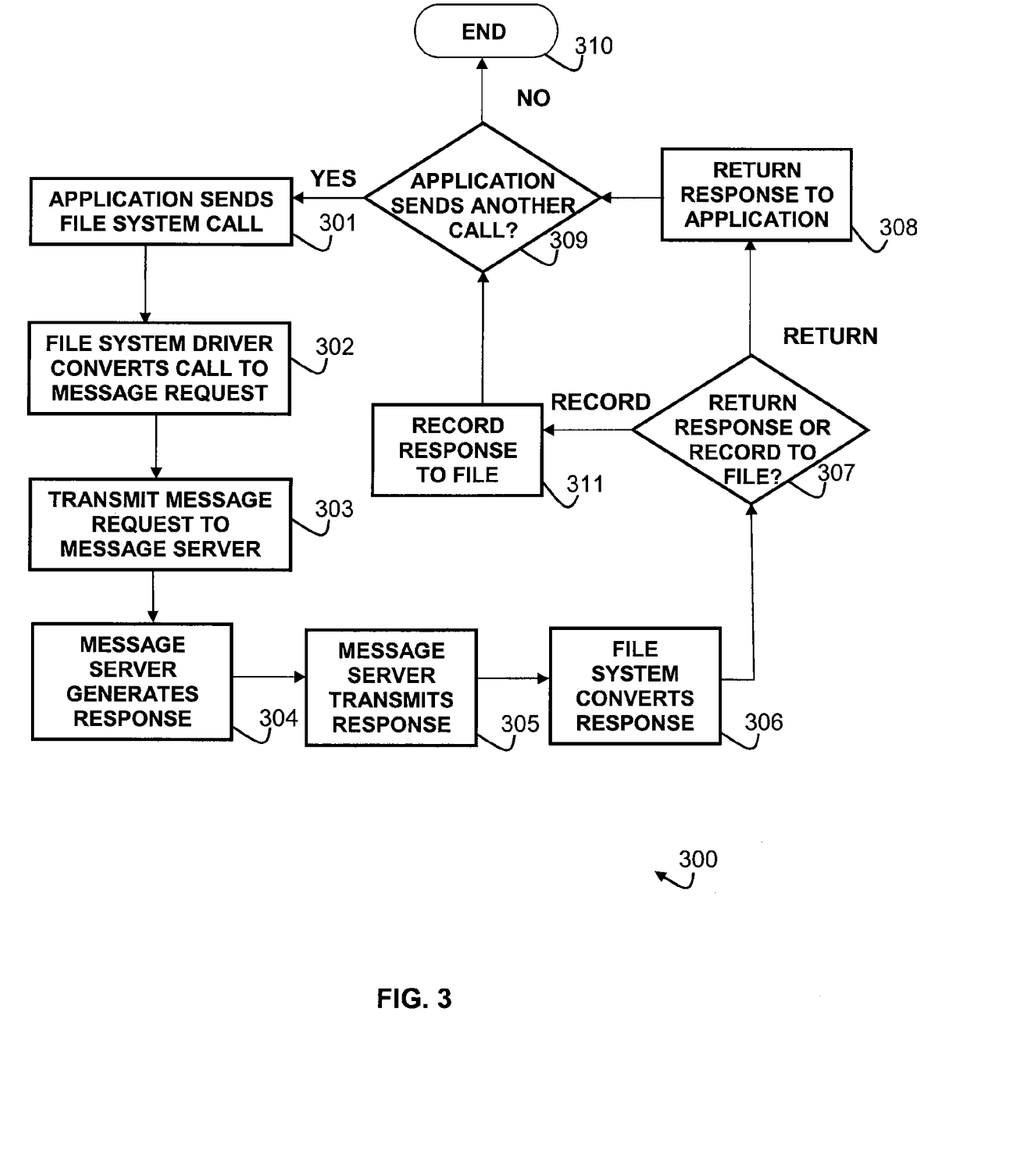
FIG. 3 is a flow chart illustrating an example flow of a method of communicating with a message service via a file system interface.

FIG. 3 illustrates another example of a of communicating with a message service via a file system interface. At block 301, an application program may send a file system call to a file system driver. At block 302, the file system driver may convert the file system call to a message service request. At block 303, the file system driver may transmit the message service request to a message service server. At block 304, the message service server may generate a message service response to respond to the message service request. At block 305, the message service server may transmit the message service response to the file system driver. At block 306, the file system driver may convert the message service response to a file system call response. At block 307, the file system driver may determine whether to return the file system call response to the application program or record the file system call response as a file system file in a file system. If the file system driver determines to return the file system call response to the application program, the flow may proceed to block 308. If the file system driver determines to record the file system call response as a file system file in a file system, the flow may proceed to block 311.

At block 308, the file system driver may return the file system call response to the application program. At block 309, the file system driver may determine whether the application program sends another file system call to the file system driver. If the application program does not send another file system call to the file system driver, the flow may proceed to block 310 and end. If the application program sends another file system call to the file system driver, the flow may proceed to block 301.

At block 311, the file system driver may record the file system call response as a file system file in a file system. The flow may then proceed to block 309, where the file system driver may determine whether the application program sends another file system call to the file system driver.

Figure 4:
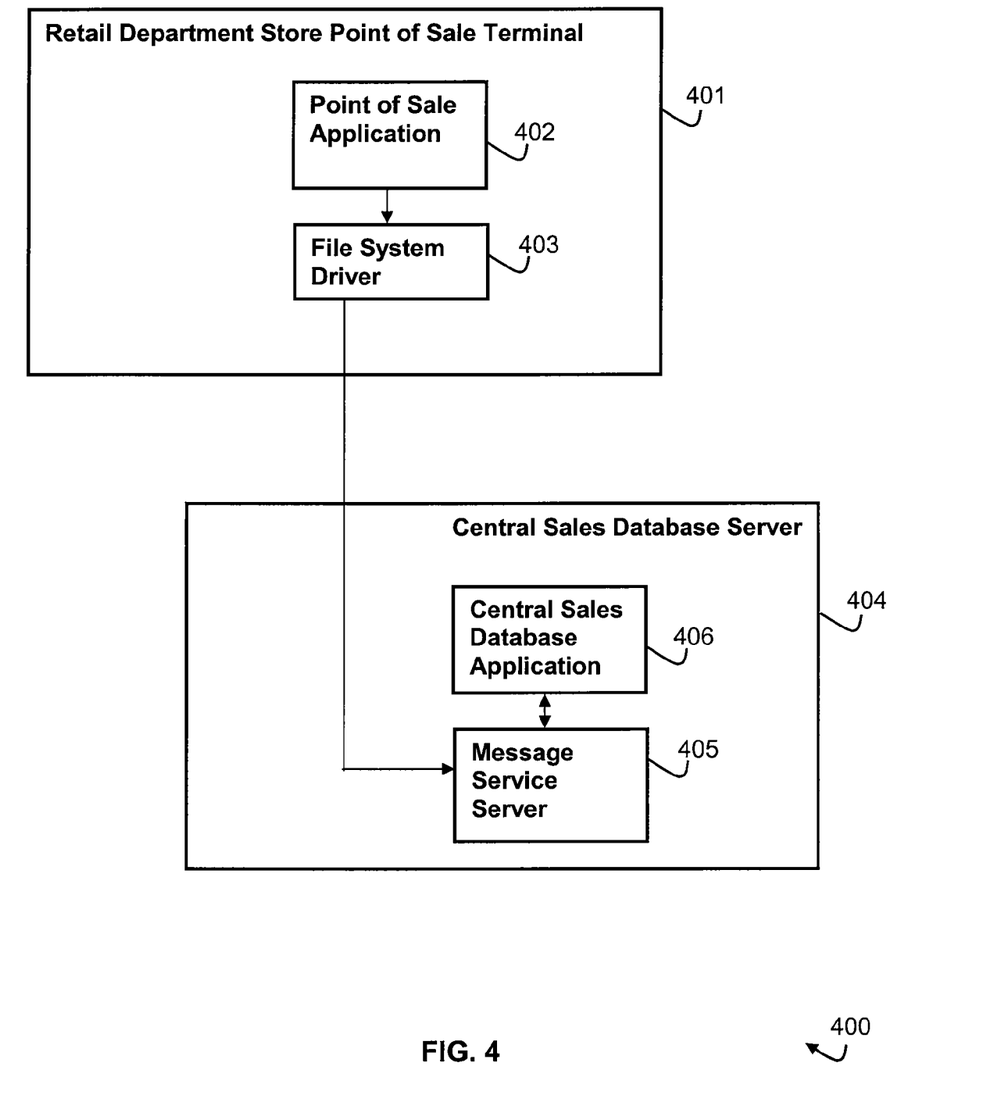
FIG. 4 is a block diagram illustrating a system 400 performing a first example implementation of the method of FIG. 2.

By way of example, FIG. 4 illustrates a system 400 performing an example implementation of the method of FIG. 2. A retail department store may transact sales utilizing a point of sale terminal 401. The point of sale terminal 401 may run a point of sale application 402. The point of sale application 402 may compile sales data related to transactions performed for the retail department store utilizing the point of sale application 402 and may periodically record the sales data to a file. The department store may aggregate the sales data from the point of sale terminal 401, along with sales data from one or more other point of sale terminals, in a central sales database application 406 running on a central sales database server 404. The central sales database application 406 may communicate utilizing a message service server 405 running on the central sales database server 404. The central sales database application 406 may aggregate sales data by reading messages, including the sales data to aggregate, posted to the message service server 405. However, the point of sale application 402 may not include capabilities for interfacing with the message service server 405.

In this example, the point of sale application 402 may periodically record sales data related to performed for the retail department store utilizing the point of sale application 402 to a file. When the point of sale application 402 records the sales data to a file, the point of sale application 402 may send a write file call, including the sales data to record, to a file system driver 403 on the point of sale terminal. Upon receiving the write file call, the file system driver 403 may convert the write file call to a message service request. The message service request may be a request to post a message including the sales data. The file system driver 403 may then transmit the message service request to the message service server 405, posting a message including the sales data. Subsequently, the central sales database application 406 may read the posted message from the message service server 405 and aggregate the sales data.

Figure 5:
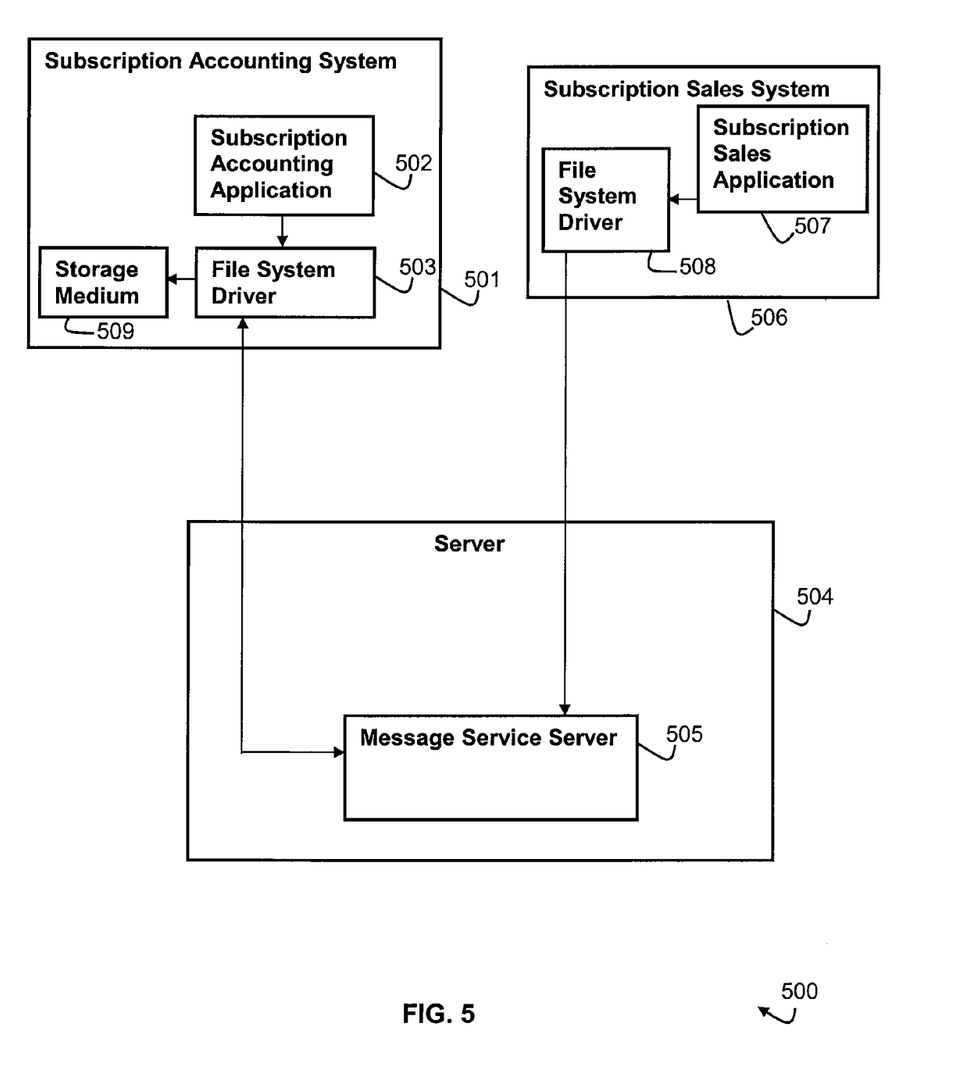
FIG. 5 is a block diagram illustrating a system 500 performing a second example implementation of the method of FIG. 2.

By way of another example, FIG. 5 illustrates a system 500 performing an example implementation of the method of FIG. 2. A magazine distribution company may sell magazine subscriptions and distribute magazines based on the sold magazine subscriptions. The magazine distribution company may keep track of magazine subscriptions to fulfill in a subscription accounting system 501. The magazine distribution company may record the sales of magazine subscriptions utilizing a subscription sales application of a subscription sales system 506. The recorded sold magazine subscriptions may then be transferred to the subscription accounting system 501 where a subscription accounting application 502 fulfills the recorded sold magazine subscriptions. The recorded sold magazine subscriptions may be transferred from the subscription sales system 506 to the subscription accounting system 501 utilizing a message service server 505 running on a server 504. The recorded sold subscriptions may be posted to the message service server 505 by the subscription sales application 507 as messages, which may then be read by the subscription accounting system 501. However, the subscription sales application 507 and the subscription accounting application 502 may not include capabilities for interfacing with the message service server 505.

In this example, the subscription sales application 507 may record sold magazine subscriptions to a file. When the subscription sales application 507 records the sold magazine subscription to a file, the subscription sales application 507 may send a write file call, including the sold magazine subscription to record, to a file system driver 508 on the subscription sales system 506. Upon receiving the write file call, the file system driver 508 may convert the write file call to a message service request. The message service request may be a request to post a message including the sold magazine subscription. The file system driver 508 may then transmit the message service request to the message service server 505, posting a message including the sold magazine subscription. Subsequently, the subscription accounting application 502 may read the posted message from the message service server 505 and record the contained recorded sold magazine subscription to a storage medium 509, such as in a database stored in the tangible storage medium 509.

In this example, the subscription accounting application 502 may read the contained recorded sold magazine subscription from a file. When the subscription accounting application 502 reads the recorded sold magazine subscription from a file, the subscription accounting application 502 may send a read file call to a file system driver 503 on the subscription accounting system 501. Upon receiving the read file call, the file system driver 503 may convert the read file call to a message service request. The message service request may be a request to read a message. The file system driver 503 may then transmit the message service request to the message service server 505. In response to the message service request, the message service server 505 may transmit a message service response to the file system driver 503. The message service response may include the contents of the message, which may include a recorded sold magazine subscription. The file system driver 503, upon receiving the message service response, may convert the message service response into a read file call response. The read file call response may include information about the recoded sold magazine subscription formatted as a file system file. The file system driver 503 may then record the read file call response as a file system file in the tangible storage medium 509. Subsequently, the subscription accounting application 502 may fulfill magazine subscriptions according to file system files stored in the tangible storage medium 509.

Figure 6:
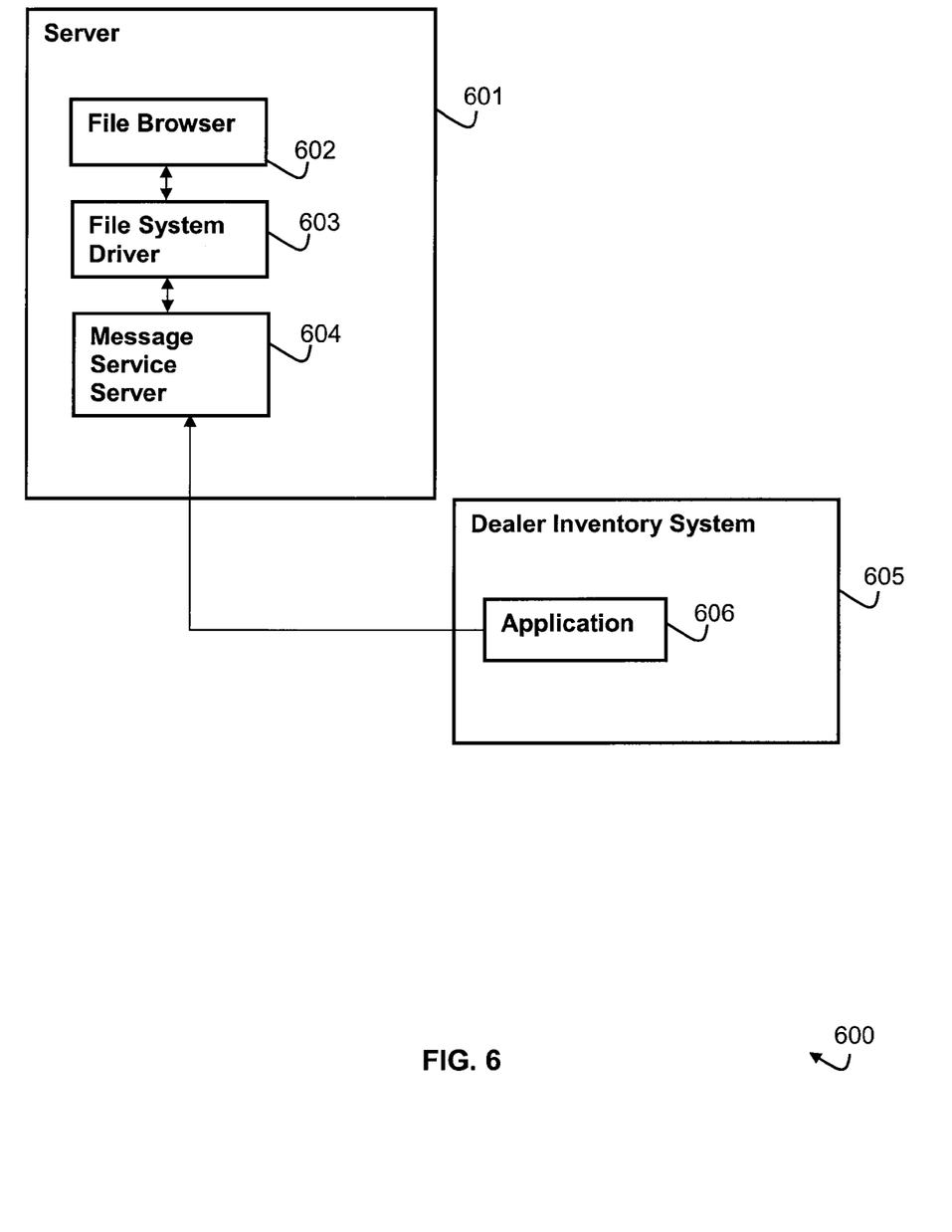
FIG. 6 is a block diagram illustrating a system 600 performing a third example implementation of the method of FIG. 2.

By way of a third example, FIG. 6 illustrates a system 600 performing an example implementation of the method of FIG. 2. An automobile manufacturer may utilize a message service server 604 running on a server 601 to communicate with a dealer inventory system 605. An application 606 running on the dealer inventory system 605 may periodically post messages regarding inventory of the dealer to the message service server 604. A file browser 602 (such as Windows™ Explorer) running on the server 601 may be utilized to manage the message service server 604. However, the file browser 602 may not include capabilities for interfacing with the message service server 604.

In this example, the file browser 602 may be utilized to read a file directory. When the file browser 602 is utilized to read the file directory, the file browser 602 may send a read directory call to a file system driver 603 on the server 601. Upon receiving the read directory call, the file system driver 603 may convert the read directory call to a message service request. The message service request may be a request to read a message queue. The file system driver 603 may then transmit the message service request to the message service server 604. In response to the message service request, the message service server 604 may transmit a message service response to the file system driver 603. The message service response may include the contents of the queue. The file system driver 603, upon receiving the message service response, may convert the message service response into a read directory call response. The read directory call response may include information about the contents of the queue formatted as a file system directory. The file system driver 603 may then return the read directory call response to the file browser 602, which may display the read directory call response.

The present disclosure provides systems and methods for communicating with a message service system via a file system interface. This interface enables application programs, which do not inherently have the capability to utilize a message service system, to communicate via a message service. Further, this interface enables simple and uniform administration of message service implementations by allowing an administration application to interact message queues as file system directories and messages as file system files.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A computer-implemented method, comprising:
   receiving, at a file system driver, a file system call for a file system from an application program executing on a computing device, the application program inherently incapable of utilizing a message service server to communicate; and
   enabling the inherently incapable application program to communicate via the messaging service server by:
   converting, using the file system driver, the received file system call into a message service request;
   transmitting the message service request to the message service server;
   receiving a message service response from the message service server, the message service response transmitted by the message service server in response to the transmitted message service request;
   converting the received message service response into a file system call response, the file system call response including information formatted as contents of a file wherein said converting the received message service response into a file system call response comprises converting the received message service response into a file system call response with the file system driver; and
   storing the file system call response as a file system file in a file system.

2. The computer-implemented method of claim 1, wherein the file system call and the message service request respectively comprise at least one of a create file call and a corresponding post message request, a read file call and a corresponding read message request, and a delete file call and a corresponding delete message request.

3. The computer-implemented method of claim 1, wherein the file system call and the message service request respectively comprise at least one of a create directory call and a corresponding create queue request, a read directory call and a corresponding read queue request, and a delete directory call and a corresponding delete queue request.

4. The computer-implemented method of claim 1, further comprising
returning the file system call response to the application program.

5. The computer-implemented method of claim 1, wherein the message service response includes contents of a message and the file system call response includes information formatted as contents of a file system file.

6. The computer-implemented method of claim 1, wherein the message service response includes contents of a queue and the file system call response includes information formatted as contents of a file system directory.

7. The computer-implemented method of claim 1, wherein the message service server is executing on the computing device.

8. The computer-implemented method of claim 1, wherein the message service server is executing on an additional computing device.

9. The computer-implemented method of claim 1, wherein the application program comprises a file browser.

10. The computer-implemented method of claim 1, wherein the file system driver enables uniform administration of different message service implementations by allowing interaction with the messages as files of the file system.

11. The computer-implemented method of claim 1, wherein the transmitted message service request is executed on an additional computing device.

12. A computer-implemented messaging system, comprising:
a computing device, the computing device including a file system driver;
an application program executing on the computing device, the application program inherently incapable of utilizing a message service server to communicate; and
the message service server, communicably connected to the file system driver, the file system driver to:
receive a file system call from the application program; and
enable the inherently incapable application program to communicate via the message service server by:
converting the received file system call into a message service request; and
transmitting the message service request to the message service server wherein the file system driver is further configured to receive a message service response from the message service server wherein the message service response was transmitted by the message service server in response to the transmitted message service request, convert the received message service response into a file system call response, and return the file system call response to the application program.

13. The computer-implemented messaging system of claim 12, wherein the message service server is executing on the computing device.

14. The computer-implemented messaging system of claim 12, further comprising an additional computing device, communicably coupled to the computing device, wherein the message service server is executing on the additional computing device.

15. A computer program product, including a non-transitory computer readable storage medium and instructions executable by a processing unit tangibly embodied in the computer readable storage medium, the instructions comprising:
a first set of instructions for receiving a file system call from an application program, the application program inherently incapable of utilizing a message service server to communicate; and
a second set of instructions to enable the inherently incapable application to communicate via the message service server by:
converting the received file system call into a message service request using a file system driver; and
transmitting the message service request to the message service server a third set of instructions to the file system driver to receive a message service response from the message service server wherein the message service response was transmitted by the message service server in response to the transmitted message service request, convert the received message service response into a file system call response, and return the file system call response to the application program.

16. The computer program product of claim 15 wherein the message service response includes contents of a message and the file system call response includes information formatted as contents of a file system file or contents of a queue and includes information formatted as contents of a file system directory; and
further comprising a fourth set of instructions for storing the file system call response as a file system file in a file system.

17. The computer program product of claim 15, wherein the file system call and the message service request respectively comprise at least one of a create file call and a corresponding post message request, a read file call and a corresponding read message request, a delete file call and a corresponding delete message request, a create directory call and a corresponding create queue request, a read directory call and a corresponding read queue request, and a delete directory call and a corresponding delete queue request.

18. The computer program product of claim 15, wherein the message service server is executing on a computing device executing the computer program product or on an additional computing device.

19. The computer program product of claim 15, wherein the file system driver enables uniform administration of different message service implementations by allowing interaction with the messages as files of a file system.

20. The computer program product of claim 15, wherein the transmitted message service request is executed on an additional computing device.

* * * * *

UNITED STATES PATENT AND TRADEMARK OFFICE
CERTIFICATE OF CORRECTION

PATENT NO. : 8,826,300 B2  
APPLICATION NO. : 12/368117  
DATED : September 2, 2014  
INVENTOR(S) : Turnbull

Page 1 of 1

It is certified that error appears in the above-identified patent and that said Letters Patent is hereby corrected as shown below:

In the Specification

In column 7, line 3, delete "of a of" and insert -- of --, therefor.

Signed and Sealed this  
Twenty-fourth Day of March, 2015

Michelle K. Lee  
*Director of the United States Patent and Trademark Office*